United States Patent [19]
Speicher, III et al.

[11] Patent Number: 6,135,036
[45] Date of Patent: Oct. 24, 2000

[54] BROADCAST SPREADER WITH REPLACEABLE SPINNER

[75] Inventors: Daniel E. Speicher, III, Leesburg; Robert B. Beck, Urbana; Cecil L. Weaver, Wabash, all of Ind.

[73] Assignee: Cyclone Manufacturing Company, Urbana, Ind.

[21] Appl. No.: 09/237,293

[22] Filed: Jan. 25, 1999

Related U.S. Application Data

[63] Continuation-in-part of application No. 09/069,923, Apr. 30, 1998, abandoned.
[60] Provisional application No. 60/045,431, May 2, 1997.
[51] Int. Cl.⁷ .................................................. A01C 17/00
[52] U.S. Cl. ........................... 111/11; 239/685; 239/687; 222/610; 222/623
[58] Field of Search ...................... 111/130, 11; 239/685, 239/681, 687, 665, 666; 222/610, 623, 410, 609

[56] References Cited

U.S. PATENT DOCUMENTS

| | | |
|---|---|---|
| 1,715,325 | 5/1929 | Hayden . |
| 2,134,664 | 10/1938 | Heitshu . |
| 2,601,534 | 6/1952 | Laffoon . |
| 2,886,334 | 5/1959 | Presler . |
| 2,920,793 | 1/1960 | Munsell . |
| 3,944,137 | 3/1976 | Cutchins et al. ..................... 239/681 X |
| 4,487,370 | 12/1984 | Speicher ................................. 239/687 |
| 4,548,362 | 10/1985 | Doering ................................. 239/685 |
| 4,867,381 | 9/1989 | Speicher ................................. 239/665 |
| 4,991,781 | 2/1991 | Barbieri ............................. 239/681 X |
| 5,054,693 | 10/1991 | Chow ..................................... 239/681 |
| 5,722,591 | 3/1998 | Folger ................................ 239/681 X |
| 5,842,648 | 12/1998 | Havlovitz et al. .................. 239/685 X |

Primary Examiner—Christopher J. Novosad
Attorney, Agent, or Firm—Baker & Daniels

[57] ABSTRACT

A broadcast spreader includes a perforated, dished spinner defining a concave upper surface which is particularly adapted to spreading pelletized mulch. The shaft upon which the spinner is mounted is jointed to permit sections of the shaft to be disconnected, and the spinner replaced with a conventional spinner to enable spreading of fertilizer and seeds, etc., or with a mulch spreader of a different size to accommodate different types of mulch.

20 Claims, 4 Drawing Sheets

BROADCAST SPREADER WITH REPLACEABLE SPINNER

This application is a continuation-in-part of U.S. patent application Ser. No. 09/069,923, filed Apr. 30, 1998, now abandoned, which claims domestic priority based upon U.S. Provisional Patent Application No. 60/045,431 filed May 2, 1997.

This invention relates to a broadcast spreader.

Broadcast spreaders are commonly used for spreading particulate, granular, or other spreadable material over areas. Such broadcast or rotary type spreaders are commonly used to spread landscaping or gardening materials, such as seed, fertilizer, and mulch, and may also be used to spread other types of material, such as de-icing materials. This type of spreader includes a frame supported on wheels which carries a large hopper for storage of the material to be spread. A handle extends from the frame so that an operator may push the spreader over the area upon which material from the hopper is to be spread. The material is dispensed from the hopper to a rotary spinner which disperses material over the area to be treated. Typical prior art spreaders are disclosed in U.S. Pat. Nos. 4,487,370 and 4,867,381.

Existing spreaders are satisfactory when spreading material such as seed and fertilizer. However, it is also desirable to be able to spread pelletized mulch with a broadcast type spreader. Existing broadcast spreaders using prior art broadcast spinners do not achieve a consisting spreading pattern when spreading pelletized mulch. The present invention provides a spinner which is dish shaped and made out of a perforate material that is capable of consistently spreading pelletized mulch in consistent spreading patterns, thus enabling a broadcast spreader to be used to spread pelletized mulch. However, depending upon the type of mulch used and the desired pattern, different sizes of the spinner which is a part of the present invention must be used. Furthermore, it is desirable to use broadcast spreaders to spread both pelletized mulch and the aforementioned seed, fertilizer etc. The seed and fertilizer are not easily spread by the spinner of the present invention. For this reason also it is desirable to be able to change spinners.

However, prior art broadcast spinners are designed such that it is practically impossible to change spinners without almost completely disassembling the unit. Existing spinners are mounted on a shaft which extends into a gear box and its lower end which is connected to the wheels supporting the spinner are mounted. The other end of the shaft is mounted to the hopper through a rotary connection. It will accordingly by understood that the only way to change existing spinners on existing spreaders is to disassemble the spreader. This is obviously inconvenient, thus precluding easily changing of spinners on prior art broadcast spreaders.

According to one feature of the present invention, a dish shaped, perforated spinner is provided that is especially adapted to spread pelletized mulch. According to another feature of the present invention, the spinner is easily replaced because the rotating shaft upon which the spinner is mounted is jointed at a point between the spinner and the gear box. A collar secures the two sections of the shaft together. When it is desired to change the spinner, the two sections of the shaft are disconnected, and the section of the shaft upon which the spinner is mounted is swung away from the other section, thereby permitting removal of the old spinner and installation of a different spinner.

These and other advantages of the present invention will become apparent from the following description, with reference to the accompanying drawings in which.

Figure 1:
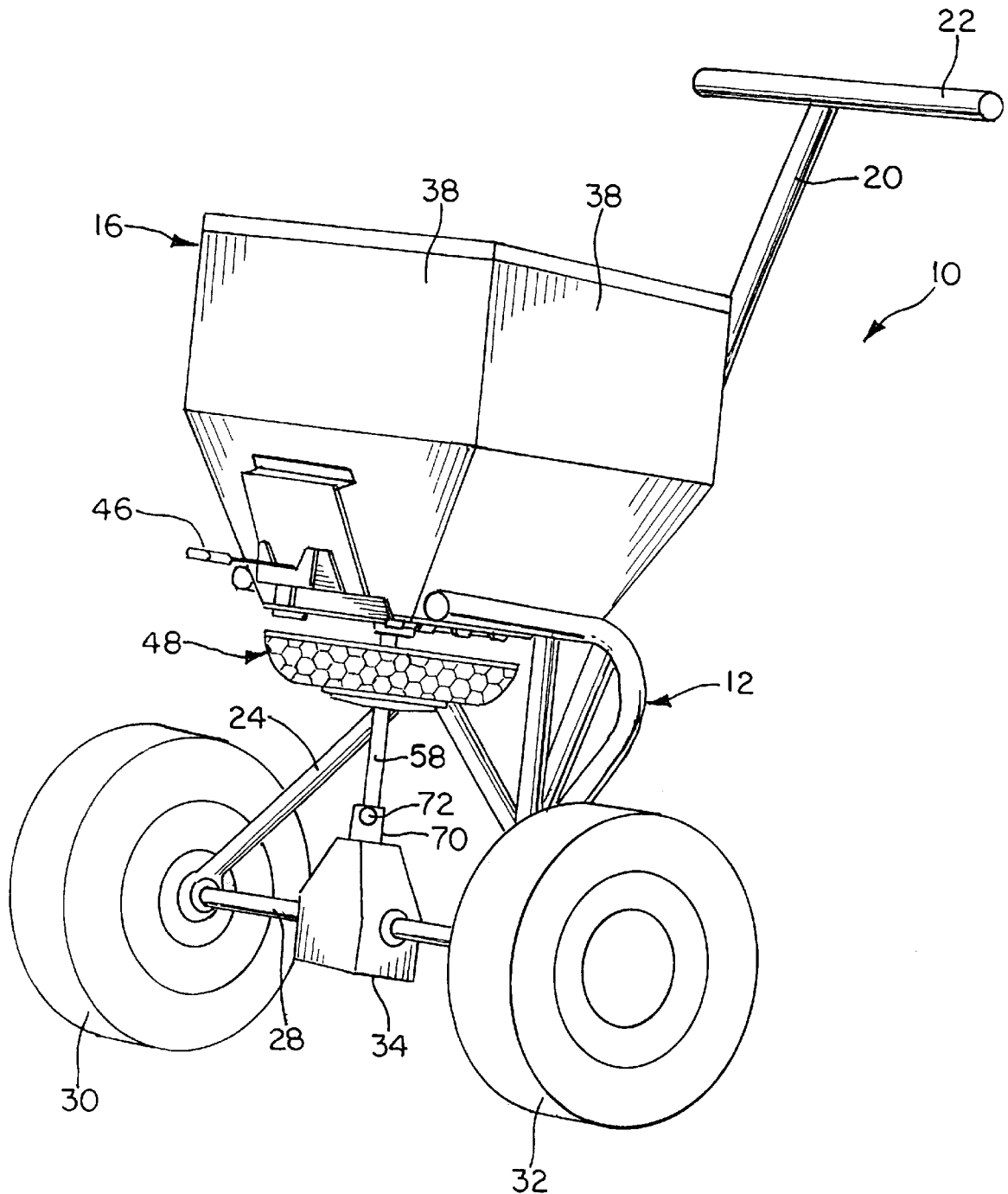
FIG. 1 is a view in perspective of a broadcast spreader made pursuant to the teachings of the present invention.
Figure 2:
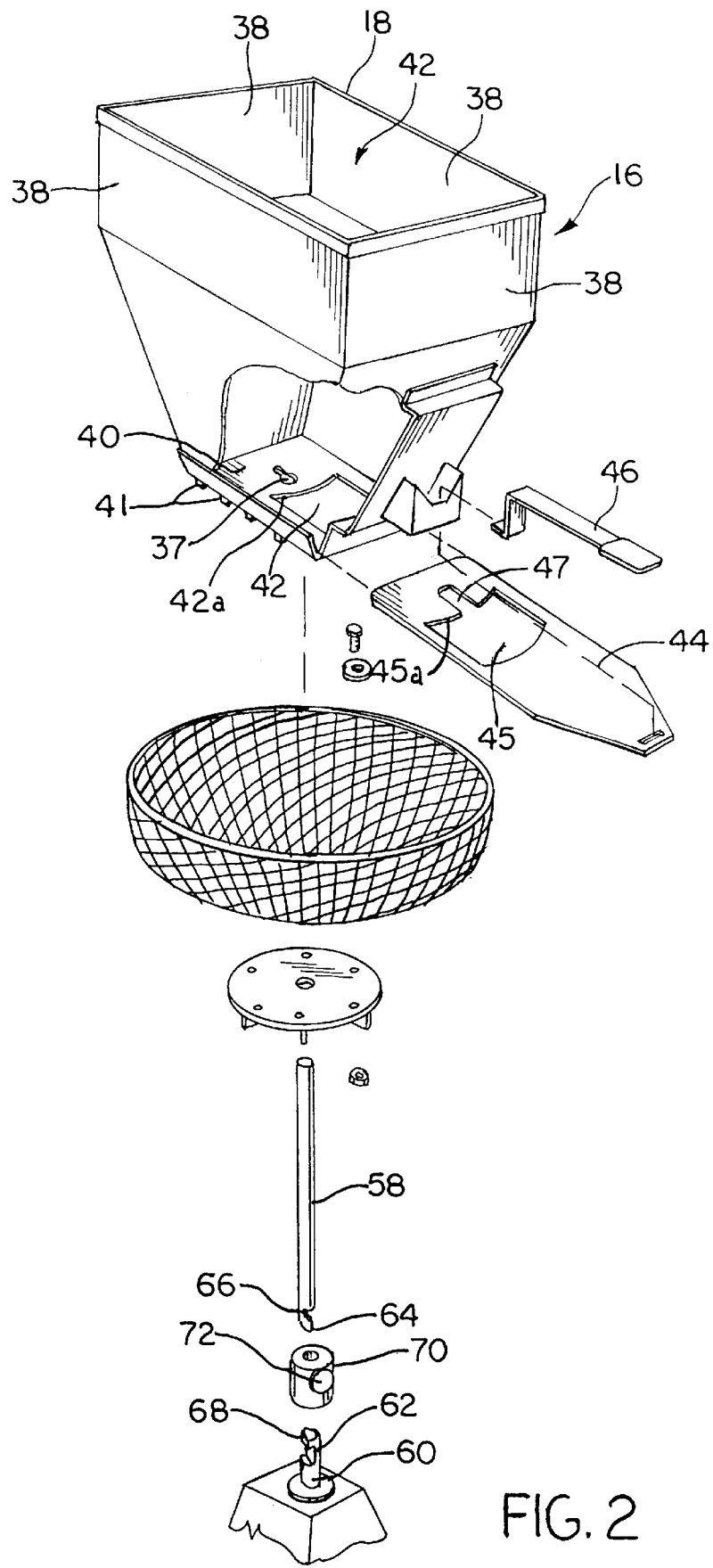
FIG. 2 is an exploded fragmentary view in perspective of some of the components of the spreader illustrated in FIG. 1.

Referring now to the drawings, a broadcast spreader generally indicated by the numeral 10 includes a frame generally indicated by the numeral 12, which support a conventional hopper generally indicated by the numeral 16. The hopper is provided with an open upper end 18 into which material that is to be spread by the spreader 10 may be poured. Frame 12 further includes an upwardly extending portion 20 which terminates in a handle 22. Handle 22 is grasped by the operator when the spreader is used.

Frame 12 further includes a pair of downwardly extending legs 24. Each of the legs 24 rotatably support opposite end portions of axle 28. Wheels 30,32 are rigidly mounted opposite end portions of the axle 28 such that rotation of the wheels 30,32 also rotates the axle 28. A gearbox 34 mounted on the axle 28 between the ends thereof is conventional and includes bevel gears (not shown) drivingly connecting the axle 28 to one end of a shaft 36. The opposite end of the shaft 36 rotates in a bushing 35 mounted in aperture 37 in bottom wall 40 of hopper 16.

The hopper 16 includes side walls 38 and the bottom wall 40, which cooperate to define a cavity 42. Cavity 42 receives the material poured through open end 18 that is to be dispensed by the spreader 10. Bottom wall 40 includes a dispensing opening 42. A gate 44 is slidably mounted on bottom 40 by guides 41 for movement relative to the bottom 40. The gate 44 includes an aperture 45 which controls the flow of material through the dispensing opening 42. One edge of opening 45 includes an extension 47 to accommodate opening 37 and shaft 36. The position of the gate 44 relative to the dispensing opening 42 is controlled by a control lever 46. Accordingly, the gate 44 may be moved relative to bottom 40 to move the edge 45a of opening 45 toward and away from edge 42a of opening 42 to thereby vary the size of the dispensing opening.

A dished broadcasting spinner generally indicated y the numeral 48 is mounted on the shaft 36 and is formed of wire mesh to define a perforated, transversely extending, lower portion 50 and an upwardly curving edge portion 52 which terminates in a circumferentially extending, upper rim 54. The transverse portion 50 and upwardly curving portion 52 cooperate to define a concave upper surface of the spinner 48 which receives material dispensed from the hopper 16 through the opening 42 and spreads the material by hurling it away from the spreader 10 due to the centrifugal force generated by rotation of the spinner 48. A transversely extending, imperforate reinforcing plate 56 is secured to portion 50 and covers a portion of the lower surface 50 and is secured to the shaft 36 by an appropriate set screw (not shown).

Figure 3:
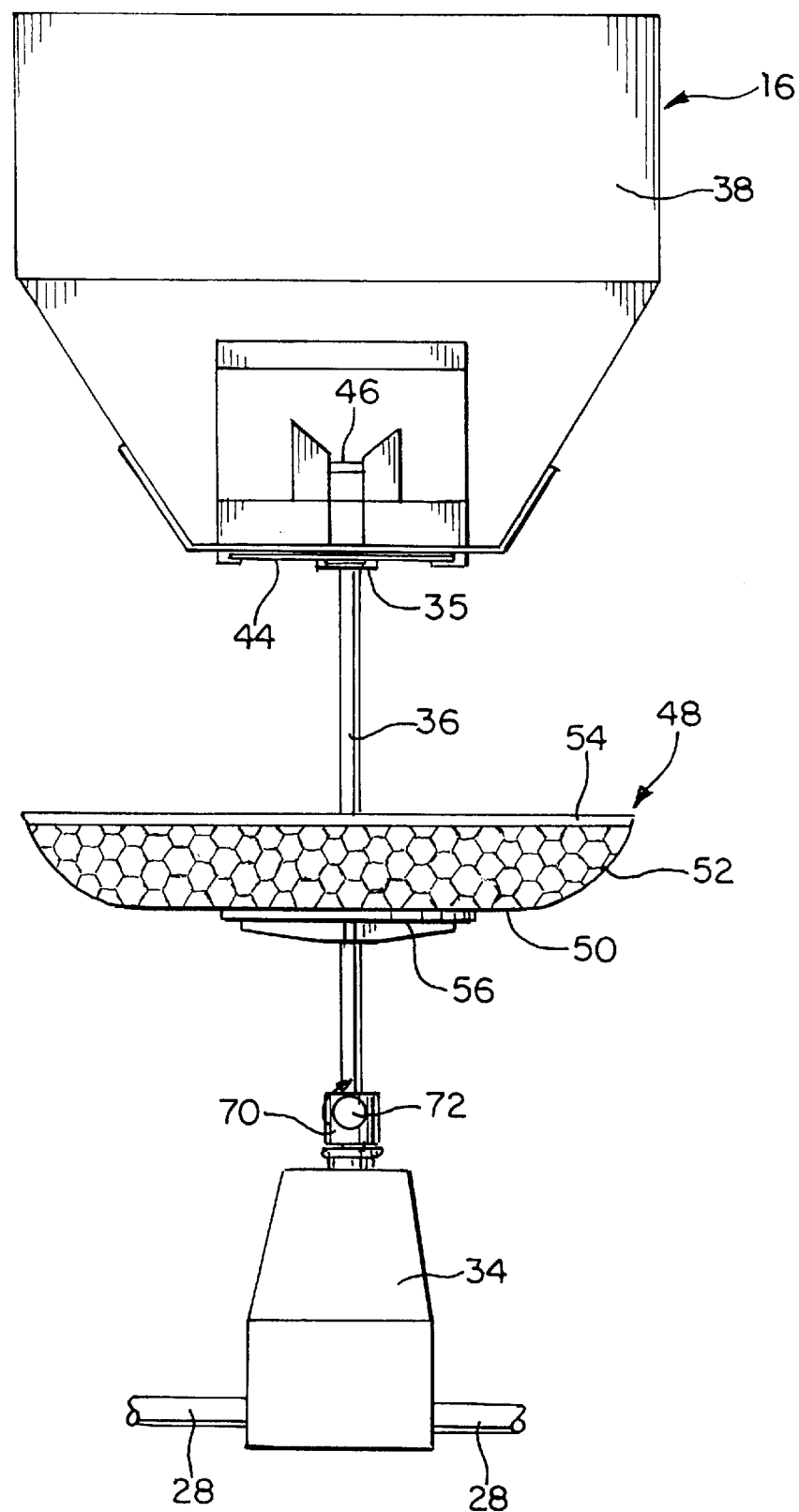
FIG. 3 is a fragmentary front elevational view of the spreader illustrated in FIG. 1.

Of course, the spreading pattern achieved by the spinner 48 will vary depending upon the type of material spread. The spinner 48 is used to spread particulate mulch, and depending upon the type of mulch, different sizes of spinners 48 will be required. If material other than mulch, such as seeds or fertilizer are to be spread, the perforated spinner 48 is not appropriate and a conventional spinner is necessary. To facilitate removal of the spinner 48 and installation of an alternate spinner, the shaft 36 is divided into an upper section 58 which is supported in the bushing 35 and a stub section 60 which extends from the gear box 34 and includes an undercut 62 which receives the projecting portion 64 on upper section 58, which also includes an under cut 66 which receives projecting portion 68 of stub shaft 60. A collar 70 with set screw 72 slides along the shaft 36 and can be lowered to the position illustrated in FIG. 3 such that the collar 70 clamps the end of the section 58 to the end of stub section 60 to thereby maintain the engagement of the projecting portions 64, 68 with their corresponding undercut section 62, 66, thus permitting the gear box to turn the shaft 36.

Figure 4:
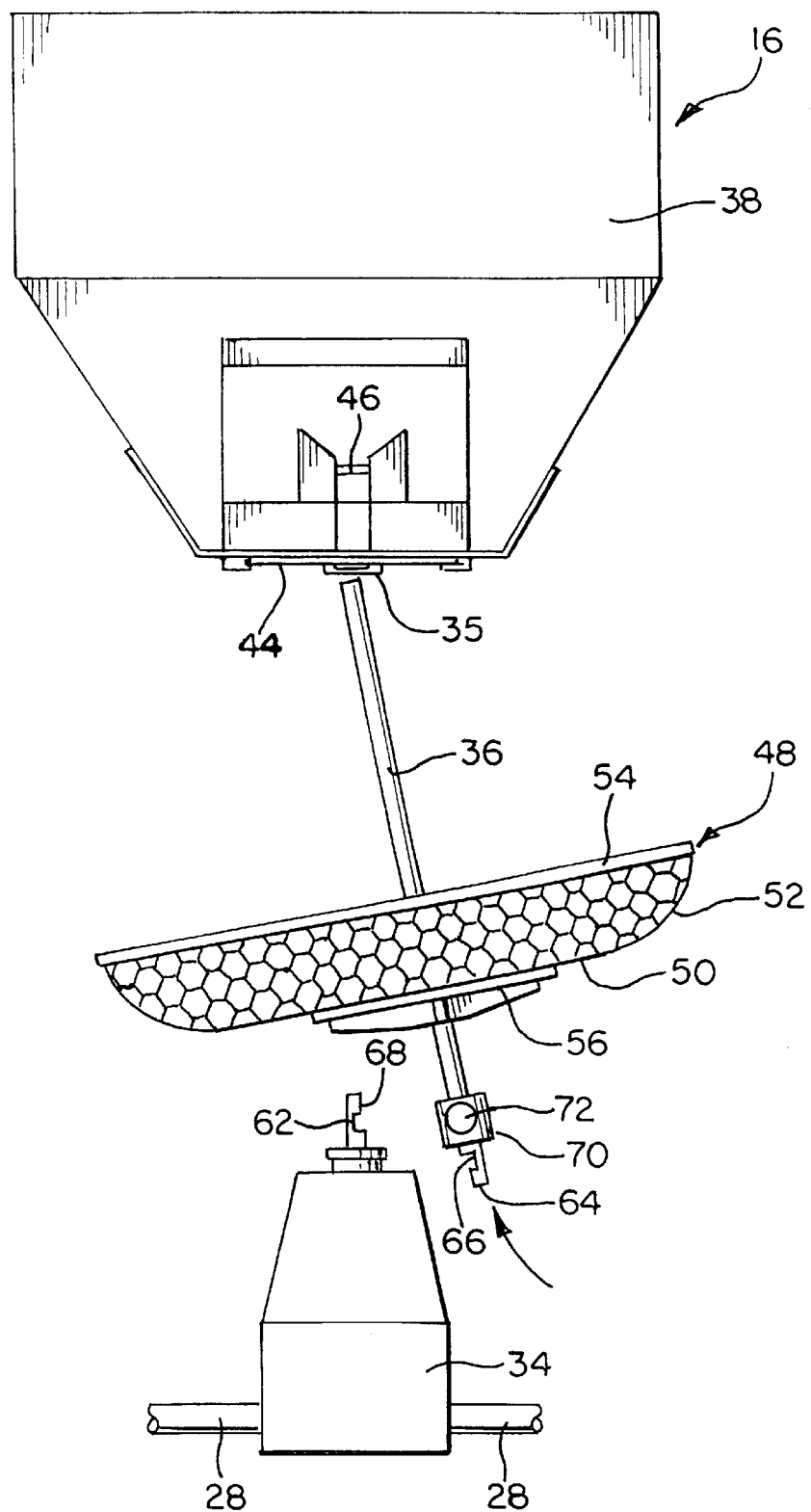
FIG. 4 is a view similar to FIG. 3 but illustrating the manner in which the spinner and shaft section upon which the spinner is mounted can be swung away to permit replacement of the spinner.

In operation, material is spread by adjusting the opening 42 by movement of the gate 44 via the handle 46 to allow particulate mulch to drop from the hopper 16 onto the concave surface of the spinner 48. As discussed above, rotation of the spinner 48 hurls the material outwardly, thus distributing the material over the surface over which the spreader 10 is moved. The pattern through which the material is spread is determined by the type of material spread and by the size and shape of the spinner 48. If a different type of mulch is to be spread, it is sometimes necessary to change the spinner 48 to a different size such that the concave surface defined by the transverse section 50 and upwardly curving portion 52 is changed to accommodate a different type of mulch. Changing of the spinner 48 is accomplished by loosening the set screw 72 and then raising the collar 70 upwardly onto the section 58 of the shaft 36, thereby permitting the upper section 58 of the shaft to be swung to one side and then pulled out of the bushing 35, there being sufficient play between the shaft and the bushing to permit the section 58 to be moved into the FIG. 4 position. Spinner 48 can then be removed from the section 58 of the shaft and a different spinner installed thereon. The upper section 58 of the shaft is then reinstalled by inserting in the shaft 58 into the bushing 35 and by reengaging the collar 70 to hold the sections of the shaft together. Accordingly, different types and sizes of mulch spinners similarly to the perforated spinner 48 may be installed to thereby permit spreading of different types and sizes of mulch in different patterns, but the same spreader may also be used to spread seeds, fertilizer etc. by replacing the spinner 48 with a conventional spinner. Accordingly, the spreader 10 may be used to spread a wide variety of material, while changing the type of spinner necessary to accommodate the different types of spinner is relatively easy due to the releasable couplings between the sections of the shaft 36.

What is claimed is:

1. Spreader for spreading spreadable material comprising a hopper having side walls and a lower wall defining a storage volume for storing a quantity of said spreadable material, said side walls defining an opening opposite the lower wall through which the spreadable material is dispensed into the hopper, wheels supporting said hopper for movement across a surface upon which the spreadable material is to be spread, said hopper having a discharge opening in the lower wall for dispensing said spreadable material, a generally upright shaft rotatably mounted on the hopper and connected to said wheels for rotation by the wheels as the wheels move the hopper over said surface, and a dished broadcasting spinner mounted on said shaft for rotation thereby, said dished broadcasting spinner including a concave upper surface facing said discharge opening for receiving and distributing the spreadable material discharged through the discharge opening as the broadcasting spinner is rotated by said upright shaft.

2. Broadcast spreader as claimed in claim 1, wherein said dished broadcasting spinner includes a perforated portion.

3. Broadcast spreader as claimed in claim 1, wherein said broadcasting spinner includes a portion extending transversely relative to said upright shaft, said broadcasting spinner terminating in an upwardly curving, circumferentially extending edge portion cooperating with the transversely extending portion to define said concave upper surface.

4. Broadcast spreader as claimed in claim 3, wherein said edge portion and said transversely extending portion are perforated.

5. Broadcast spreader as claimed in claim 4, wherein an imperforate reinforcing plate extends radially outwardly from said shaft supporting said transversely extending portion.

6. Broadcast spreader as claimed in claim 3, wherein said shaft includes a pair of sections, one of said sections being rotatably mounted on said hopper, the other section being rotatably connected to said wheels, and a releasable coupling securing said sections together whereby upon release of the coupling, the broadcasting spinner may be removed from said shaft and replaced without coupling said other shaft section from the wheels.

7. Broadcast spreader as claimed in claim 6, wherein said other section is connected to said wheels through a gearbox responsive to rotation of said wheels to rotate the other section, said wheels being mounted on axles connected to said gearbox.

8. Broadcast spreader as claimed in claim 6, wherein said releasable coupling includes a collar circumscribing said shaft, said sections terminating in cooperating portions securing each of said shaft sections together when coupled by said collar against rotation relative to one another.

9. Broadcast spreader as claimed in claim 6, wherein said one section is both rotatably and deflectably mounted on said hopper to permit said one section to be swung away from the other section upon release of the coupling to permit the broadcasting spinner to be installed or removed from said other section.

10. Spreader for spreading spreadable material comprising a hopper having side walls and a lower wall defining a storage volume for storing a quantity of said spreadable material, said side walls defining an opening opposite the lower wall through which the spreadable material is dispensed into the hopper, wheels supporting said hopper for movement across a surface upon which the spreadable material is to be spread, said hopper having a discharge opening in the lower wall for dispensing said spreadable material, a generally upright shaft rotatably mounted on the hopper and connected to said wheels for rotation by the wheels as the wheels move the hopper over said surface, and a broadcasting spinner mounted on said shaft for rotation thereby, said broadcasting spinner receiving and distributing the spreadable material discharged through the discharge opening as the broadcasting spinner is rotated by said upright shaft, said shaft including a pair of sections, one of said sections being rotatably mounted on said hopper, the other section being rotatably connected to said wheels, and a releasable coupling securing said sections together whereby upon release of the coupling the broadcasting spinner may be removed from said shaft and replaced without uncoupling said other shaft section from the wheels .

11. Broadcast spreader as claimed in claim 10, wherein said other section is connected to said wheels through a transmission responsive to rotation of said wheels to rotate the other section, said wheels being mounted on axles connected to said transmission.

12. Broadcast spreader as claimed in claim 10, wherein said releasable coupling includes a collar circumscribing said shaft, said sections terminating in cooperating portions securing each of said shaft sections together when coupled by said collar against rotation relative to one another.

13. Broadcast spreader as claimed in claim 12, wherein said one section is both rotatably and deflectably mounted on said hopper to permit said one section to be swung away from the other section upon release of the coupling to permit the broadcasting spinner to be installed or removed from said other section.

14. Broadcast spreader as claimed in claim 10, wherein said one section is both rotatably and deflectably mounted on said hopper to permit said one section to be swung away from the other section upon release of the coupling to permit the broadcasting spinner member to be installed or removed from said other section.

15. Broadcast spreader as claimed in claim 10, wherein said broadcasting spinner is perforated.

16. A spreader for spreading spreadable material comprising a hopper for holding the spreadable material, a drive mechanism driven by wheels, an intermediate connection member rotably supported by said hopper and rotably driven by said driving mechanism, and a spinner connected to and rotably turned by the intermediate connection member for spreading spreadable material dispensed from the hopper, said spinner being removable and replaceable without disassembling the driving mechanism.

17. The spreader as set forth in claim 16, including a releasable coupling for coupling the intermediate connection member to the drive mechanism.

18. The spreader as set forth in claim 17, further comprising a first shaft section partially within and rotably driven by said driving mechanism, and wherein said intermediate connection member is a second shaft section, said first and second shaft sections being coupled together by said releasable coupling.

19. The spreader as set forth in claim 18, wherein said releasable coupling includes a collar circumscribing said shaft sections, each of said first and second sections having an end with cooperating portions securing said shaft sections together when coupled by said collar to transfer the rotation of said first section as rotated by said driving mechanism to said second shaft section.

20. The spreader as set forth in claim 19, wherein releasing said releasable coupling is the sole means for facilitating the removal of said second shaft section for replacement of said spinner.

* * * * *